(12) United States Patent
Kusnierek et al.

(10) Patent No.: US 11,261,795 B2
(45) Date of Patent: Mar. 1, 2022

(54) DUAL MODE STARTER GENERATOR

(71) Applicant: ROLLS-ROYCE NORTH AMERICAN TECHNOLOGIES INC., Indianapolis, IN (US)

(72) Inventors: John Kusnierek, Springfield, OH (US); Matthew J. Starr, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 196 days.

(21) Appl. No.: 16/201,824

(22) Filed: Nov. 27, 2018

(65) Prior Publication Data

US 2020/0123980 A1    Apr. 23, 2020

Related U.S. Application Data

(60) Provisional application No. 62/747,412, filed on Oct. 18, 2018.

(51) Int. Cl.
*F02C 7/268* (2006.01)
*F02C 7/277* (2006.01)
(Continued)

(52) U.S. Cl.
CPC ............ *F02C 7/277* (2013.01); *F01D 15/10* (2013.01); *F01D 19/00* (2013.01); *F02C 7/275* (2013.01);
(Continued)

(58) Field of Classification Search
CPC .. F02C 7/36; F02C 7/268; F02C 7/275; F02C 7/277; F02C 7/266
See application file for complete search history.

(56) References Cited

U.S. PATENT DOCUMENTS 2,959,918 A * 11/1960 West ................ F02C 7/277
60/788
3,188,479 A    6/1965 Wood et al.
(Continued)

FOREIGN PATENT DOCUMENTS

EP    3205848 A1    8/2017
EP    3211184 A1    8/2017
(Continued)

OTHER PUBLICATIONS

Extended European Search Report from counterpart EP Application No. 19198377.4 dated Mar. 25, 2020, 8 pgs.
(Continued)

*Primary Examiner* — Gerald L Sung
(74) *Attorney, Agent, or Firm* — Shumaker & Sieffert, P.A.

(57) ABSTRACT

A system for starting a turbine engine. The system may comprise a gearbox, a first starter, and a second starter. The gearbox may have a gearbox input shaft. The gearbox may be coupled to the turbine engine. The gearbox input shaft may be rotatively coupled to a spool of the turbine engine. The first starter may be coupled to the gearbox input shaft. The second starter may have a second-starter output shaft. The second-starter output shaft may be coaxial with the gearbox input shaft. The second starter may be coupled to the gearbox input shaft through the first starter.

10 Claims, 18 Drawing Sheets

(51) Int. Cl.
   *F01D 15/10* (2006.01)
   *F02C 7/32* (2006.01)
   *F16H 1/22* (2006.01)
   *F01D 19/00* (2006.01)
   *F02C 7/275* (2006.01)
   *F02K 3/06* (2006.01)

(52) U.S. Cl.
   CPC .............. *F02C 7/32* (2013.01); *F16H 1/22* (2013.01); *F02K 3/06* (2013.01); *F05D 2220/32* (2013.01); *F05D 2220/76* (2013.01); *F05D 2260/4031* (2013.01); *F05D 2260/85* (2013.01)

(56) References Cited

U.S. PATENT DOCUMENTS

| | | | | |
|---|---|---|---|---|
| 4,030,291 | A | * | 6/1977 | Sargisson ............... F02K 1/70 60/226.2 |
| 4,077,202 | A | | 3/1978 | Schutze |
| 4,336,856 | A | * | 6/1982 | Gamell ............... B60K 6/105 180/165 |
| 5,174,109 | A | | 12/1992 | Lampe |
| 5,201,798 | A | | 4/1993 | Hogan |
| 5,309,708 | A | | 5/1994 | Stewart, Jr. et al. |
| 7,805,947 | B2 | | 10/2010 | Moulebhar |
| 7,937,949 | B2 | | 5/2011 | Eccles et al. |
| 8,905,191 | B2 | | 12/2014 | Brandt et al. |
| 9,664,070 | B1 | | 5/2017 | Clauson et al. |
| 2004/0255590 | A1 | | 12/2004 | Rago et al. |
| 2005/0000224 | A1 | * | 1/2005 | Jonsson ............... F02C 7/36 60/793 |
| 2005/0103931 | A1 | | 5/2005 | Morris et al. |
| 2005/0284214 | A1 | | 12/2005 | Gustafson et al. |
| 2006/0254253 | A1 | | 11/2006 | Herlihy et al. |
| 2006/0260323 | A1 | | 11/2006 | Moulebhar |
| 2007/0040383 | A1 | * | 2/2007 | Mehl ............... F02N 11/04 290/36 R |
| 2007/0151258 | A1 | * | 7/2007 | Gaines ............... F02K 3/06 60/792 |
| 2008/0072568 | A1 | | 3/2008 | Moniz et al. |
| 2008/0148881 | A1 | | 6/2008 | Moniz et al. |
| 2008/0149445 | A1 | | 6/2008 | Kern et al. |
| 2009/0007568 | A1 | | 1/2009 | Eccles et al. |
| 2009/0064683 | A1 | | 3/2009 | Moniz et al. |
| 2009/0302152 | A1 | | 12/2009 | Knight |
| 2011/0101693 | A1 | | 5/2011 | Goi et al. |
| 2011/0185744 | A1 | | 8/2011 | Tong et al. |
| 2011/0284328 | A1 | | 11/2011 | Brandt et al. |
| 2012/0031104 | A1 | | 2/2012 | Copeland |
| 2012/0117982 | A1 | | 5/2012 | Suciu et al. |
| 2013/0061601 | A1 | * | 3/2013 | Fuller ............... F02C 3/04 60/787 |
| 2013/0193688 | A1 | | 8/2013 | Duong et al. |
| 2013/0247539 | A1 | | 9/2013 | Hoppe |
| 2016/0040601 | A1 | | 2/2016 | Frost et al. |
| 2017/0234232 | A1 | | 8/2017 | Sheridan et al. |
| 2017/0234234 | A1 | | 8/2017 | Pech et al. |
| 2017/0234235 | A1 | | 8/2017 | Pech |
| 2017/0328282 | A1 | * | 11/2017 | Jensen ............... F02C 7/32 |
| 2017/0363012 | A1 | | 12/2017 | Clauson et al. |
| 2018/0010480 | A1 | | 1/2018 | Hockaday et al. |
| 2018/0030900 | A1 | | 2/2018 | Mathis et al. |
| 2018/0118357 | A1 | * | 5/2018 | Yasuda ............... B64D 27/26 |
| 2018/0149091 | A1 | | 5/2018 | Howell et al. |
| 2018/0223740 | A1 | | 8/2018 | Forest et al. |
| 2018/0230946 | A1 | | 8/2018 | Virtue, Jr. et al. |
| 2018/0347471 | A1 | * | 12/2018 | Wotzak ............... F02C 7/275 |
| 2020/0116085 | A1 | | 4/2020 | Polly et al. |
| 2020/0123979 | A1 | | 4/2020 | Kusnierek et al. |
| 2020/0123981 | A1 | | 4/2020 | Kusnierek et al. |
| 2020/0123982 | A1 | | 4/2020 | Kusnierek et al. |

FOREIGN PATENT DOCUMENTS

| | | |
|---|---|---|
| EP | 3266989 A1 | 1/2018 |
| EP | 3318727 A1 | 5/2018 |
| EP | 3361073 A1 | 8/2018 |
| FR | 2897895 A1 | 8/2007 |
| JP | 4510634 B2 | 7/2010 |

OTHER PUBLICATIONS

U.S. Appl. No. 16/201,835 filed by Kusnierek et al. on Nov. 27, 2018.

U.S. Appl. No. 16/201,831 filed by Kusnierek et al. on Nov. 27, 2018.

U.S. Appl. No. 16/201,837 filed by Kusnierek et al. on Nov. 27, 2018.

Response to Extended European Search Report from counterpart EP Application No. 19198377.4 dated Mar. 25, 2020, filed Oct. 15, 2020, 47 pgs.

Office Action from U.S. Appl. No. 16/201,835 dated Oct. 2, 2020, 12 pgs.

Office Action from U.S. Appl. No. 16/201,831 dated Oct. 8, 2020, 16 pgs.

Office Action from U.S. Appl. No. 16/201,837 dated Oct. 8, 2020, 15 pgs.

Notice of Allowance from U.S. Appl. No. 16/201,831, dated Jan. 25, 2021, 9 pp.

Response to Office Action dated Oct. 8, 2020, from U.S. Appl. No. 16/201,831, filed Dec. 17, 2020, 8 pp.

Notice of Allowance from U.S. Appl. No. 16/201,835, dated Feb. 4, 2021, 9 pp.

Response to Office Action dated Oct. 2, 2020, from U.S. Appl. No. 16/201,835, filed Dec. 21, 2020, 9 pp.

Notice of Allowance from U.S. Appl. No. 16/201,837, dated Jan. 25, 2021, 10 pp.

Response to Office Action dated Oct. 8, 2020, from U.S. Appl. No. 16/201,837, filed Dec. 21, 2020, 11 pp.

* cited by examiner

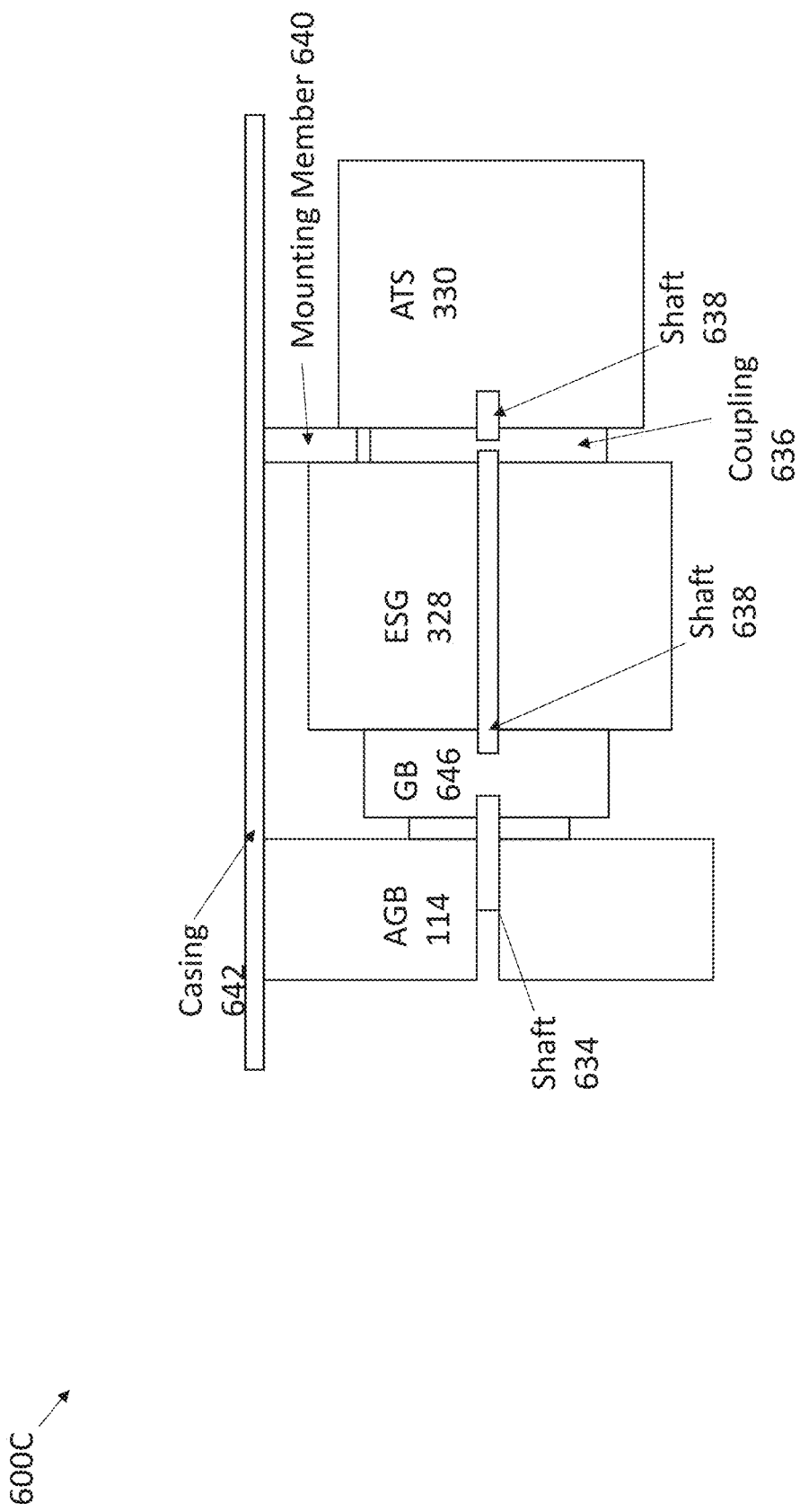

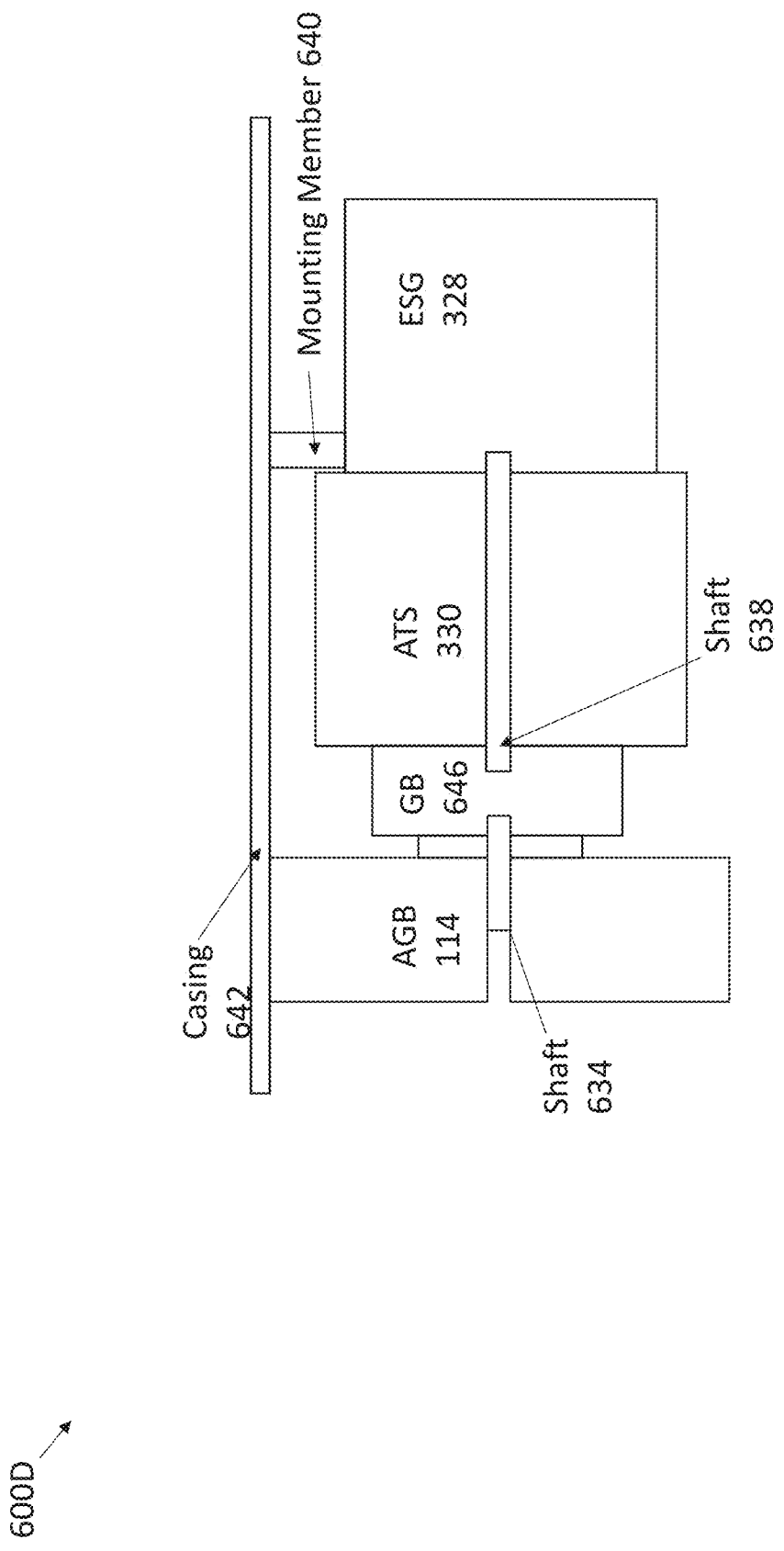

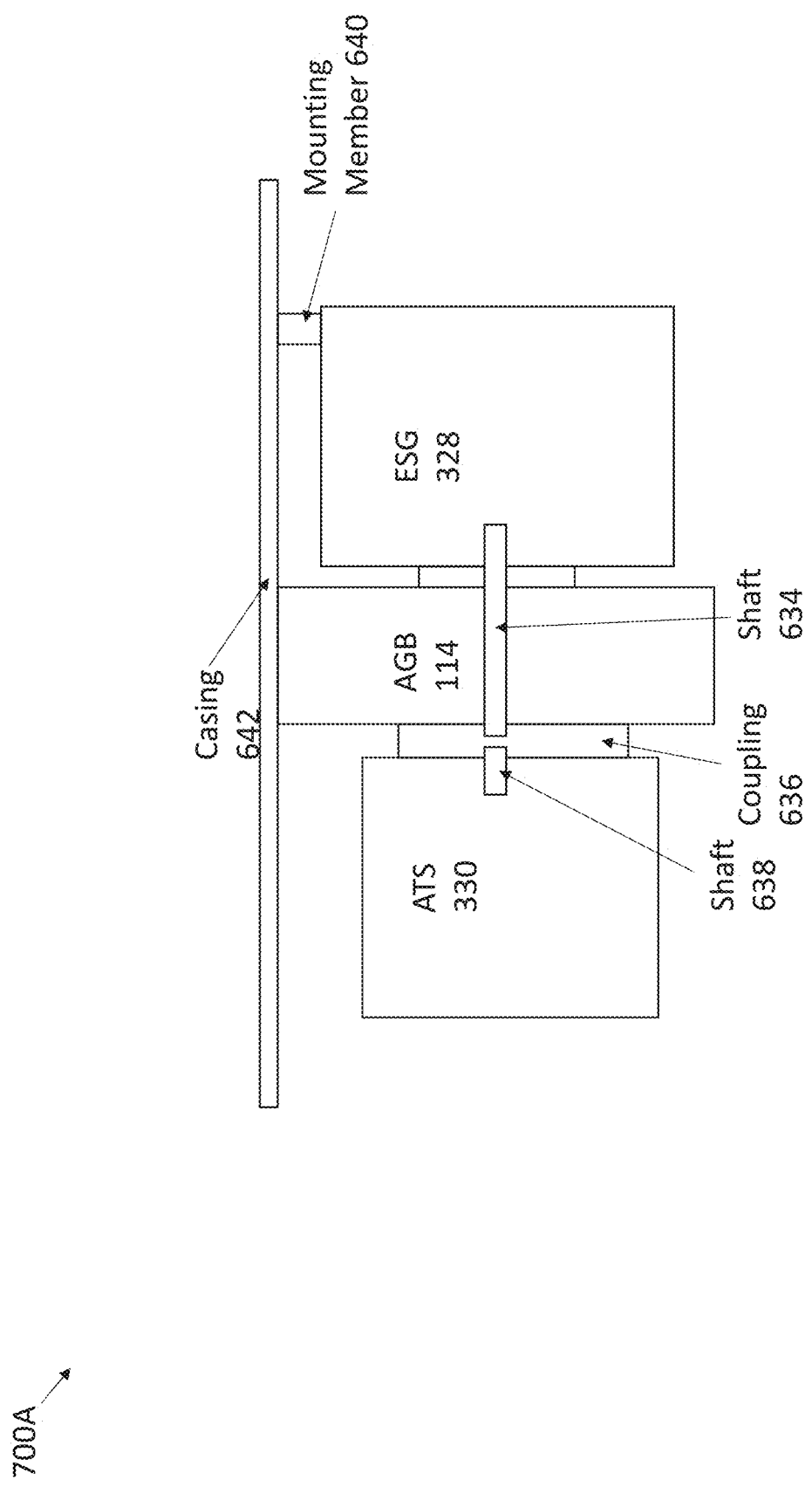

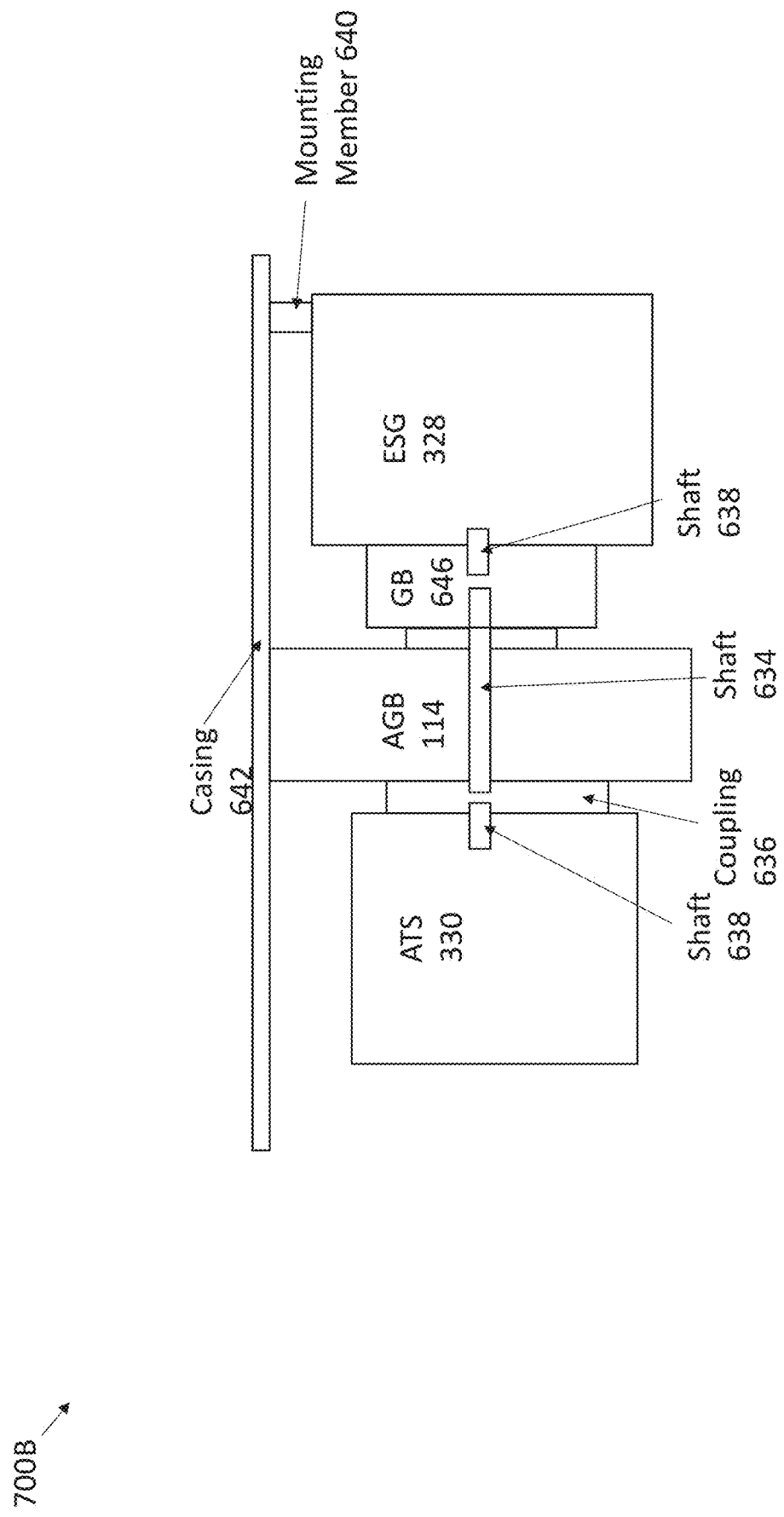

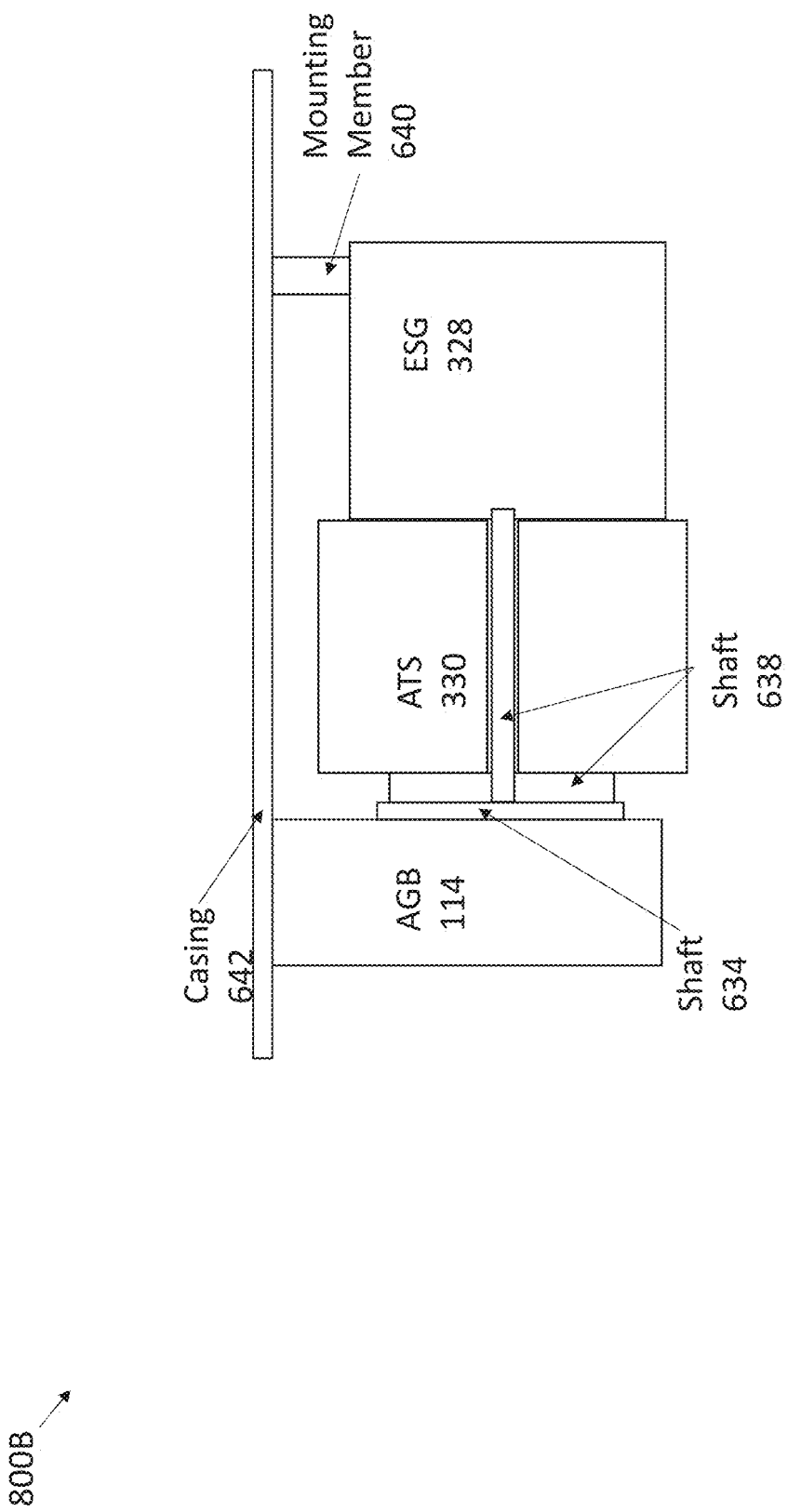

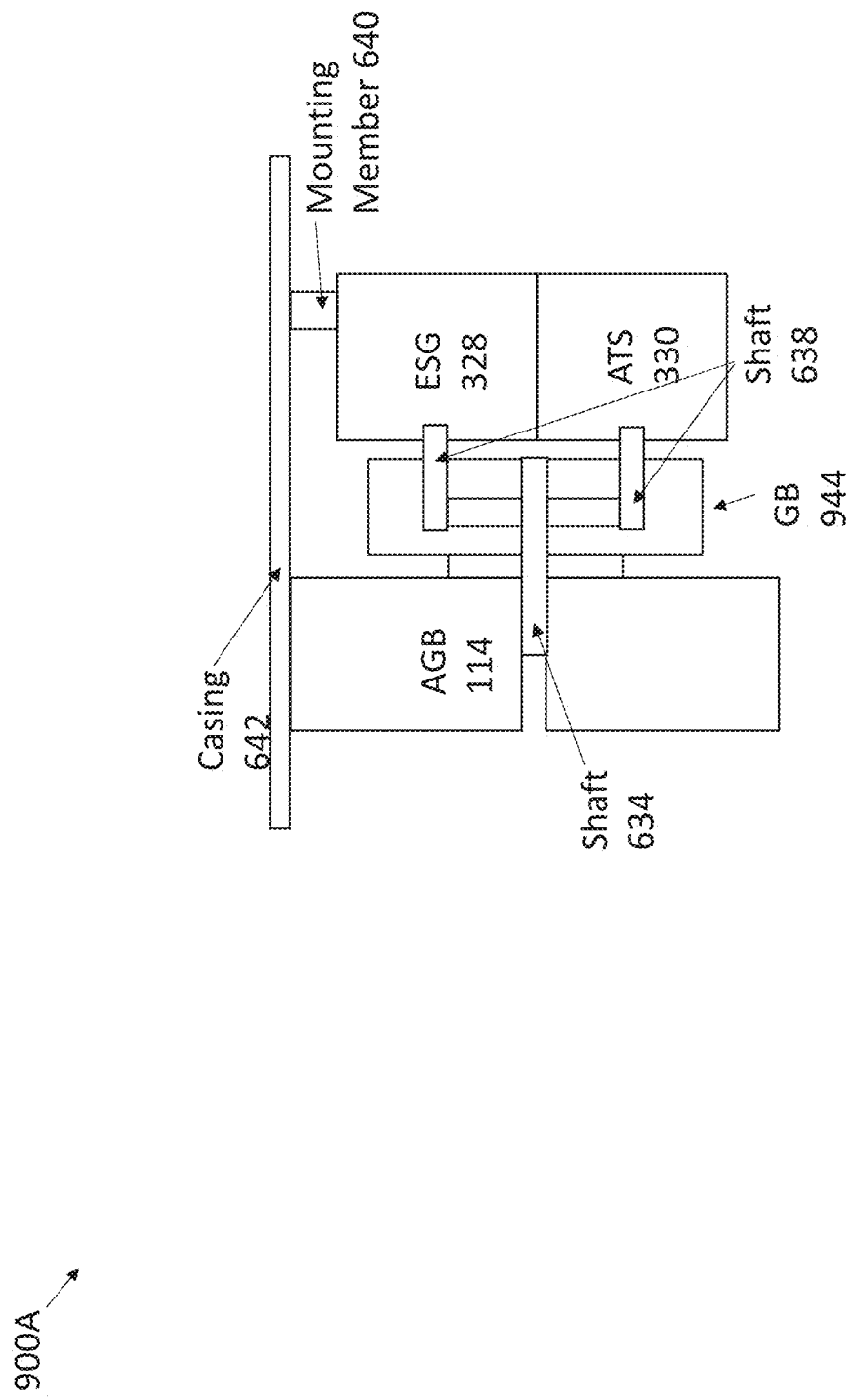

DUAL MODE STARTER GENERATOR

CROSS-REFERENCE TO RELATED APPLICATIONS

This application claims priority to U.S. Provisional Patent Application No. 62/747,412, titled "DUAL MODE STARTER GENERATOR," filed Oct. 18, 2018, first named inventor: John Kusnierek. The entirety of this prior application is hereby incorporated by reference. This application is also related to concurrently filed U.S. patent application Ser. No. 16/201,831, titled "COAXIAL STARTER/GENERATOR AND AIR TURBINE STARTER," filed Nov. 27, 2018, inventors: John Kusnierek and Matthew J. Starr; U.S. patent application Ser. No. 16/201,835, titled "PARALLEL STARTER/GENERATOR AND AIR TURBINE STARTER," filed Nov. 27, 2018, inventors: John Kusnierek and Matthew J. Starr; and U.S. patent application Ser. No. 16/201,837, titled "ACCESSORY GEARBOX WITH OPPOSITELY DISPOSED STARTER/GENERATOR AND AIR TURBINE STARTER," filed Nov. 27, 2018, inventors: John Kusnierek and Matthew J. Starr. The entirety of each of these applications is hereby incorporated by reference.

BACKGROUND

Turbine engines extract energy to perform work by compressing a working fluid, mixing a fuel into the compressed working fluid, igniting the fuel/fluid mixture, and expanding the combusted fuel/fluid mixture through a turbine. When a turbine is operating, a portion of the extracted energy is provided as the work input to the engine's compressor, thereby making turbine operation self-sustaining. Prior to reaching this self-sustaining point, the work input to drive the compressor must be supplied by some system other than the turbines of the engine. These other systems often incorporate a starter—such as an electric starter or an air turbine starter—that provides the motive force to turn the engine compressor, thereby providing an airflow to the turbine that can, eventually, provide enough work output to drive the compressor. Such starters are often connected to the spool housing the compressor through gearboxes and shafting.

SUMMARY

According to some aspects of the present disclosure, a system for starting a turbine engine is provided. The system may comprise a gearbox, a first starter, and a second starter. The gearbox may have a gearbox input shaft. The gearbox may be coupled to the turbine engine. The gearbox input shaft may be rotatively coupled to a spool of the turbine engine. The first starter may be coupled to the gearbox input shaft. The second starter may have a second-starter output shaft. The second-starter output shaft may be coaxial with the gearbox input shaft. The second starter may be coupled to the gearbox input shaft through the first starter.

According to some aspects of the present disclosure, a gas turbine starting system is provided. The gas turbine starting system may comprise a first gearbox, a second gearbox, a first starter, and a second starter. The first gearbox may have a gearbox input shaft. The gearbox input shaft may be rotationally coupled to a spool of a gas turbine. The second gearbox may be coupled to the gearbox input shaft. The first starter may be mounted on a first-starter shaft. The first starter may be coupled to the second gearbox. The second starter may be mounted on a second-starter shaft. The second starter may be coupled to the first starter. The first starter and second starter may be located on the same side of the gearbox.

According to some aspects of the present disclosure, a method of starting a turbine engine is provided. The turbine engine may have a gearbox, a first starter, and a second starter. The gearbox may have a gearbox shaft. The first starter may be coupled to the gearbox. The second starter may be coupled to the gearbox. The first starter may have a first-starter shaft. The second starter may have a second-starter shaft. The second starter may be coupled to the gearbox through the first starter. The method may comprise a first mode and a second mode. The first mode may comprise energizing the first starter, rotating the first starter, and rotating the gearbox via the first-starter shaft. The rotation of the gearbox may rotate a spool of the turbine engine. The second mode may comprise energizing the second starter, rotating the second-starter shaft, rotating the first-starter shaft via the second-starter shaft, and rotating the gearbox via the first-starter shaft. The rotation of the gearbox shaft rotates a spool of the turbine engine.

According to some aspects of the present disclosure, a system for starting a turbine engine is provided. The system may comprise a gearbox, a first starter, and a second starter. The gearbox may have an gearbox input shaft. The gearbox input shaft may be rotationally coupled to a spool of the turbine engine. The first starter may have a first-starter shaft. The second starter may have a second-starter shaft. The second-starter shaft may be coaxial with the first-starter shaft. The first starter and the second starter may each be coupled to the gearbox input shaft independently of one another.

According to some aspects of the present disclosure, a system for starting a turbine engine is provided. The system may comprise a gearbox, a first starter, and a second starter. The gearbox may have a gearbox input shaft. The gearbox input shaft may be rotationally coupled to a spool of the turbine. The first starter may have a first-starter shaft. The second starter may have a second-starter shaft. One of the first-starter shaft and the second-starter shaft may be radially outward of the other shaft.

According to some aspects of the present disclosure, a method of starting a turbine engine is provided. The turbine engine may comprise a gearbox, a first starter, and a second starter. The gearbox may be coupled to the turbine engine. The gearbox may have a gearbox input shaft. The first starter may have a first-starter shaft. The first-starter shaft may be coupled to the gearbox input shaft. The second starter may have a second-starter shaft. The second-starter shaft may be coupled to the gearbox input shaft. The first-starter shaft may radially surround the second-starter shaft along at least a portion of the axial length of the second-starter shaft. The method may comprise a first mode and a second mode. The first mode may comprise energizing the first starter, rotating the first starter-shaft, rotating the gearbox via shaft the first-starter shaft, and rotating a spool of the turbine engine via the rotation of the gearbox. The second mode may comprise energizing the second starter and rotating the second-starter shaft. The rotation of the second starter causes the rotation of the gearbox input shaft and the rotation of the first starter. The rotation of the second starter shaft is independent of the rotation of the first starter shaft during operation of the turbine engine.

According to some aspects of the present disclosure, a system for starting a turbine engine is provided. The system may comprise an gearbox, and electric starter, and an air turbine starter. The gearbox may have a gearbox input shaft.

The gearbox input shaft may be coupled to a turbine engine. The gearbox input shaft may be rotationally coupled to a spool of the turbine engine. The electric starter may be coupled to the gearbox input shaft. The air turbine starter may be coupled to the gearbox input shaft. The electric starter and the air turbine starter may be separated by the gearbox. The electric starter may be a starter-generator connected alternatively between an auxiliary power source and an auxiliary load.

According to some aspects of the present disclosure, a system of starting a turbine engine is provided. The system may comprise a gearbox, an electric starter, and an air turbine starter. The gearbox may have a gearbox input shaft. The gearbox may be coupled to the turbine engine. The gearbox input shaft may be rotationally coupled to a spool of the turbine engine. The electric starter may be mounted on the gearbox input shaft. The air turbine starter may be mounted on the gearbox input shaft. The electric starter may be located on one side of the gearbox and the air turbine starter may be located on another side of the gearbox. The electric starter may be a starter-generator that may be connected alternatively between an auxiliary power source an auxiliary load.

According to some aspects of the present disclosure, a method of operating a turbine engine starting system is provided. The system may comprise a gearbox, an electric starter, and an air turbine starter. The gearbox may have a gearbox input shaft. The gearbox may be coupled to the turbine engine. The gearbox input shaft may be rotatively coupled to a spool of the turbine engine. The electric starter may have an electric starter shaft. The electric starter shaft may be coupled to the gearbox input shaft. The air turbine starter may have an air turbine starter shaft. The air turbine starter shaft may be coupled to the gearbox input shaft. The electric starter and the air turbine starter may be separated by the gearbox. The method may comprise energizing one of the electric starter or air turbine starter, and rotating the gearbox input shaft via the respective shaft of the one of the electric starter or the air turbine starter.

According to some aspects of the present disclosure, a system for starting a turbine engine is provided. The system may comprise a gearbox, an electric starter, and an air turbine starter. The gearbox may have a gearbox input shaft. The gearbox may be coupled to the turbine engine. The gearbox input shaft may be coupled to a spool of the turbine engine. The electric starter may have an electric-starter shaft. The electric-starter shaft may be coupled to the gearbox input shaft. The air turbine starter may have an air-turbine-starter shaft. The air-turbine-starter shaft may be coupled to the gearbox input shaft. The electric-starter shaft and the air-turbine-starter shaft may be radially displaced, circumferentially displaced, or both radially and circumferentially displaced, with respect to an axis of the turbine engine, from one another. The electric starter may be a starter-generator connected alternatively between an auxiliary power source and an auxiliary load.

According to some aspects of the present disclosure, a system for starting a turbine engine is provided. The system may comprise a gearbox, an electric starter, and an air turbine starter. The gearbox may have a gearbox input shaft. The gearbox may be coupled to the turbine engine. The electric starter may have an electric-starter shaft. The electric starter may be coupled to the gearbox input shaft. The electric starter may be a starter-generator connected alternatively between an auxiliary power source and an auxiliary load. The air turbine starter may have an air-turbine-starter shaft. The air turbine starter may be coupled to said gearbox input shaft. Only one of the electric-starter shaft or air-turbine-starter shaft is coaxial with the gearbox input shaft.

According to some aspects of the present disclosure, a method of operating a turbine starting system is provided. The system may comprise a gearbox, an electric starter, and an air turbine starter. The gearbox may have a gearbox input shaft. The gearbox may be coupled to the turbine engine. The electric starter may have an electric-starter shaft. The electric starter may be coupled to the gearbox input shaft. The air turbine starter may have an air-turbine-starter shaft. The air turbine starting may be coupled to the gearbox input shaft. Only one of the electric-starter shaft or air-turbine-starter shaft is coaxial with the gearbox input shaft. The method may comprise rotating the gearbox input shaft, wherein the rotation of the gearbox input shaft rotates the turbine engine, and rotating the electric starter.

BRIEF DESCRIPTION OF THE DRAWINGS

The following will be apparent from elements of the figures, which are provided for illustrative purposes.

FIGS. 6A-6E are block diagrams of various dual mode starter generators in accordance with some embodiments.

FIGS. 7A-7B are block diagrams of various dual mode starter generators in accordance with some embodiments.

FIGS. 8A-8B are block diagrams of various dual mode starter generators in accordance with some embodiments.

FIGS. 9A-9B are block diagrams of various dual mode starter generators in accordance with some embodiments.

Figure 1:
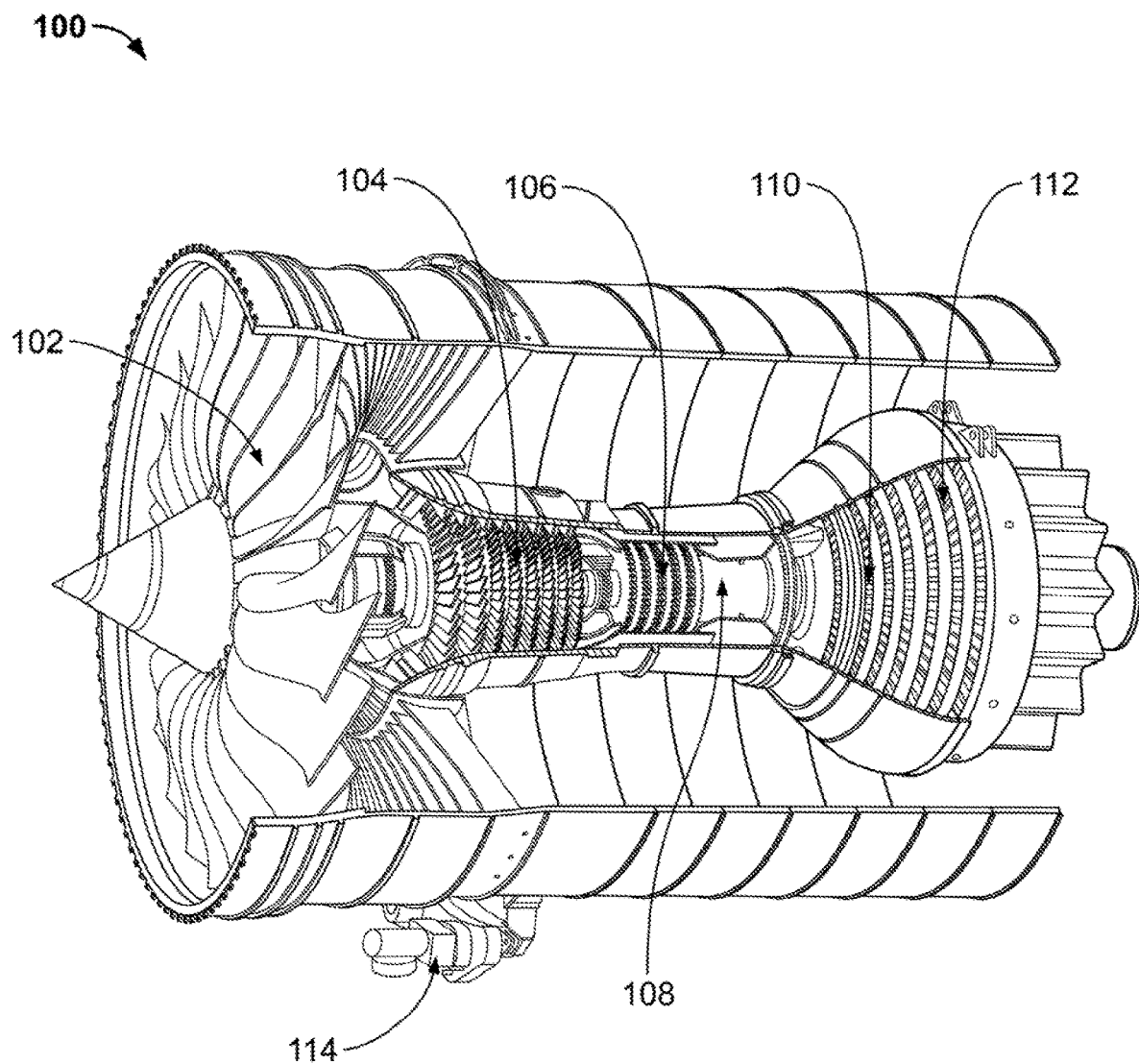
FIG. 1 is perspective view of a turbine engine and an auxiliary gearbox.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Illustrated in FIG. 1 is a perspective view of a turbine engine 100. The turbine engine 100 may be a gas turbine engine, and may comprise a fan 102, compressor sections 104 and 106, combustor 108, turbine sections 110 and 112, and an auxiliary gearbox 114. Compressor section 106 and turbine section 110 may each be coupled to a common spool, often known as the high pressure spool. Similarly, compressor section 104 and turbine section 112 may each be coupled to a different common spool, often known as the low pressure spool. Fan 102 is also coupled to the low pressure spool either directly such that fan 102 rotates at the same speed as compressor section 104 and turbine section 112 or through a gear system.

During operation of turbine engine 100, incoming air is pressurized by compressor section 104 and then compressor section 106. The compressed air is then mixed with fuel and ignited in combustor 108. The combusted air/fuel mixture is then expanded through turbine section 110 and turbine section 112. Work is extracted from the combusted air/fuel mixture during its expansion through the turbine sections. The work extracted by turbine section 110 may be used to power compressor section 106 and various auxiliary loads. These auxiliary loads may be coupled to the auxiliary gearbox 114 (see FIG. 2) that is, in turn, coupled to the high pressure spool through gearing and/or shaft work.

As explained earlier, the above operation is self-sustaining, meaning that the work output of the turbine sections, and in particular turbine section 110, is alone sufficient to drive the compressor sections, and in particular compressor section 106, such that the incoming air is pressurized so that the air/fuel mixture can be combusted and provide the required energy to drive the turbines. Until the operation of the turbine engine 100 is self-sustaining, work must be provided from some component other than turbines to rotate the compressors. These other components are referred to as starters.

Two types of starters are electric starters and air turbine starters (ATS). Both types of starters may be configured to bring a turbine engine 100 from rest to a point of self-sustaining operation. The electric starter converts electrical energy into rotational motion that drives one or more spools of the turbine engine. This electrical power could be supplied by systems onboard an aircraft (e.g., batteries or other electrical power storage devices, or electrical power generators (e.g., an auxiliary power unit (APU), another main turbine engine, etc.)), or systems external to the aircraft (e.g., a starting cart, etc.). An ATS expands a working fluid through a turbine to convert the working fluid energy into rotational motion that drives one or more spools of the turbine engine. The working fluid for an ATS may be supplied by aircraft components (e.g., APU, another main turbine engine), or systems external to the aircraft (e.g., a starting cart, etc.).

Figure 2:
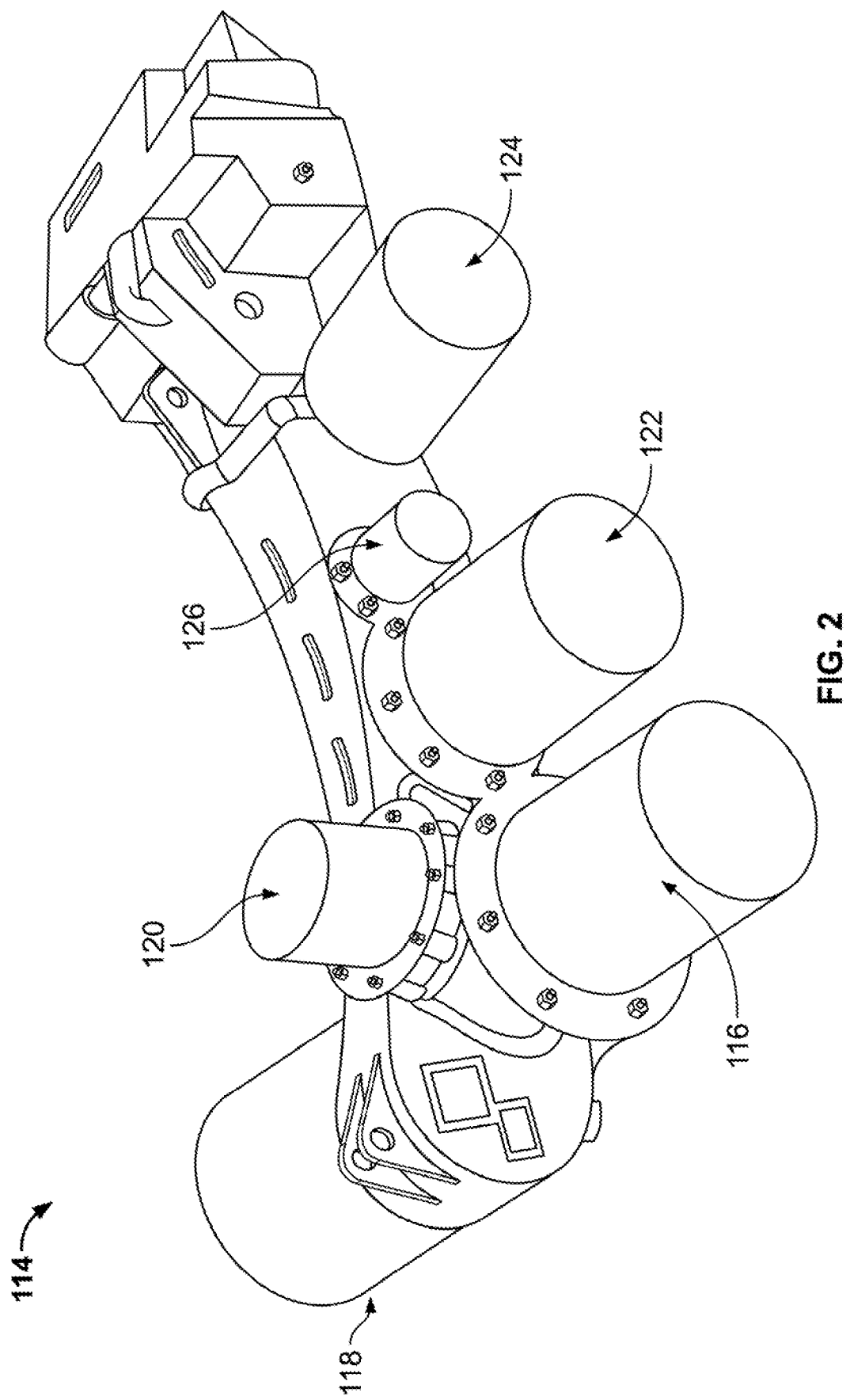
FIG. 2 is a perspective view of the auxiliary gearbox of FIG. 1.

Electric starters and ATS's may be coupled to one or more spools of the turbine engine 100 through an auxiliary gearbox. FIG. 2 illustrates an auxiliary gearbox 114. Connected to auxiliary gearbox 114 are a number of components, including a ATS 116, generator 118 (e.g., an integrated drive generator), fuel pump 120, hydraulic pump 122, oil pump 124, and permanent magnet alternator 126.

The location at which each of these components is coupled to the auxiliary gearbox 114 is known as a pad. Auxiliary gearbox pads and their associated internal auxiliary gearbox components are often designed to accommodate the specific loads of the component that couples to the pad. For example, the pad (and internal auxiliary gearbox components) to which ATS 116 is coupled is designed to support the high torque load from ATS 116 required to start the turbine engine 100, as well the static and dynamic loads from the structure of ATS 116 (e.g., bending moments). Additional components, e.g., a clutch, may be used between the ATS 116 and some components of the auxiliary gearbox 114 such that ATS 116 is not driven by the turbine engine 100 once it reaches a self-sustaining condition. Likewise, the pad to which generator 118 is connected is configured for high speed operation such that generator 118 can supply electrical power to aircraft loads during flight. However, this pad may not be capable of supporting the large, starting torque load from ATS 116.

As such, the particular components that can be coupled to a given auxiliary gearbox pad may be limited. Additionally, a turbine engine is often paired with a particular auxiliary gearbox. While a turbine engine may provide the thrust that is sufficient for an application, the electric capacity for auxiliary loads (from, e.g., generator 118) may be insufficient for that application, or a consumer may find it desirable to provide more than one mode of starting the engine. Such demands may be addressed by a redesign of the auxiliary gearbox to support different or additional components, changing the auxiliary gearbox that is mated to a particular turbine, or selection of a different turbine engine. However, these options come at a large cost.

Figure 3:
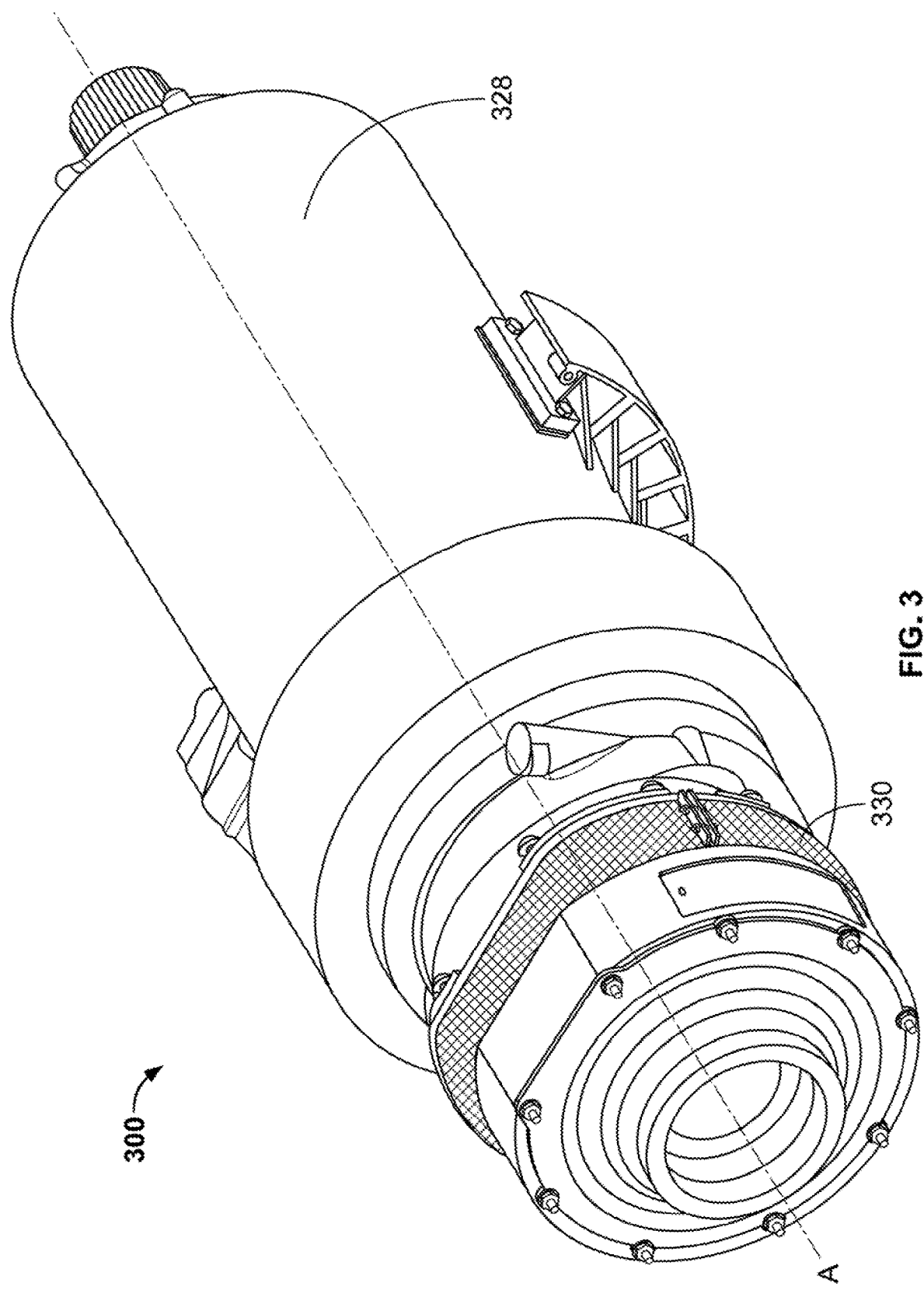
FIG. 3 is a perspective view of a dual mode starter generator in accordance with some embodiments.

As disclosed herein, the described embodiments overcome these limitations of the auxiliary gearboxes and components mounted thereto by utilizing dual mode electric starter/generator (DMSG) 300. An example of a DMSG 300 is illustrated in FIG. 3. The DMSG 300 may comprise a first starter 328 and a second starter 330, which may be an electric starter or an air turbine starter, respectively. In accordance with some embodiments, the electric starter 328 may be an electric starter-generator (ESG) in which the ESG can provide electrical energy to auxiliary loads of the aircraft when the ESG is powered by the gas turbine.

As can be seen in FIG. 3. The first and second starters, 328 and 330, may be coaxial with axis 'A.' The first and second starters, 328 and 330, may be coupled to one another such that one starter is axially forward, with respective to the turbine engine in which they are mounted, of the other. For example, second starter 330 may be axially forward of first starter 328.

Figure 4:
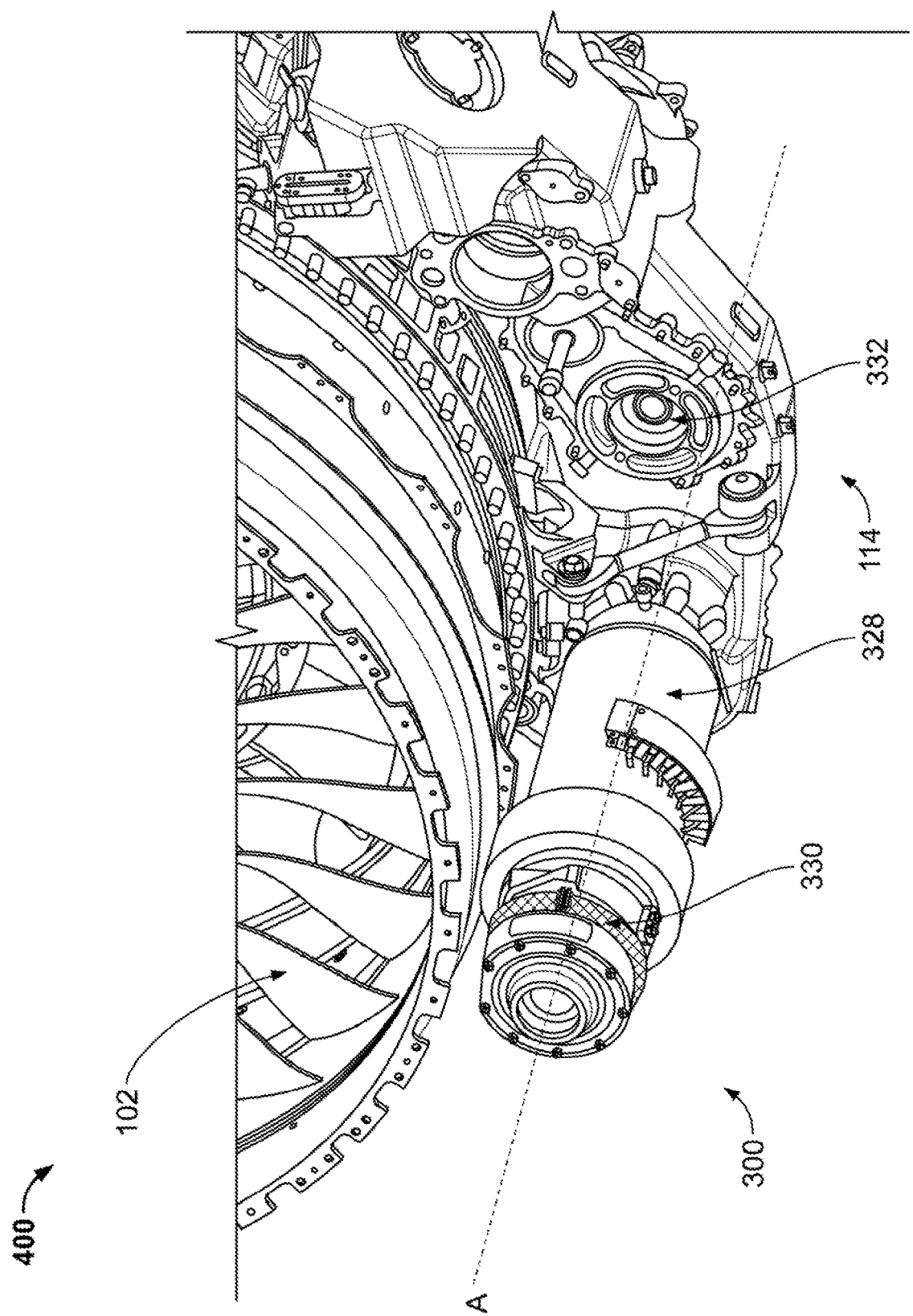
FIG. 4 is a perspective view of the dual mode starter generator of FIG. 3 installed on an auxiliary gearbox.
Figure 5:
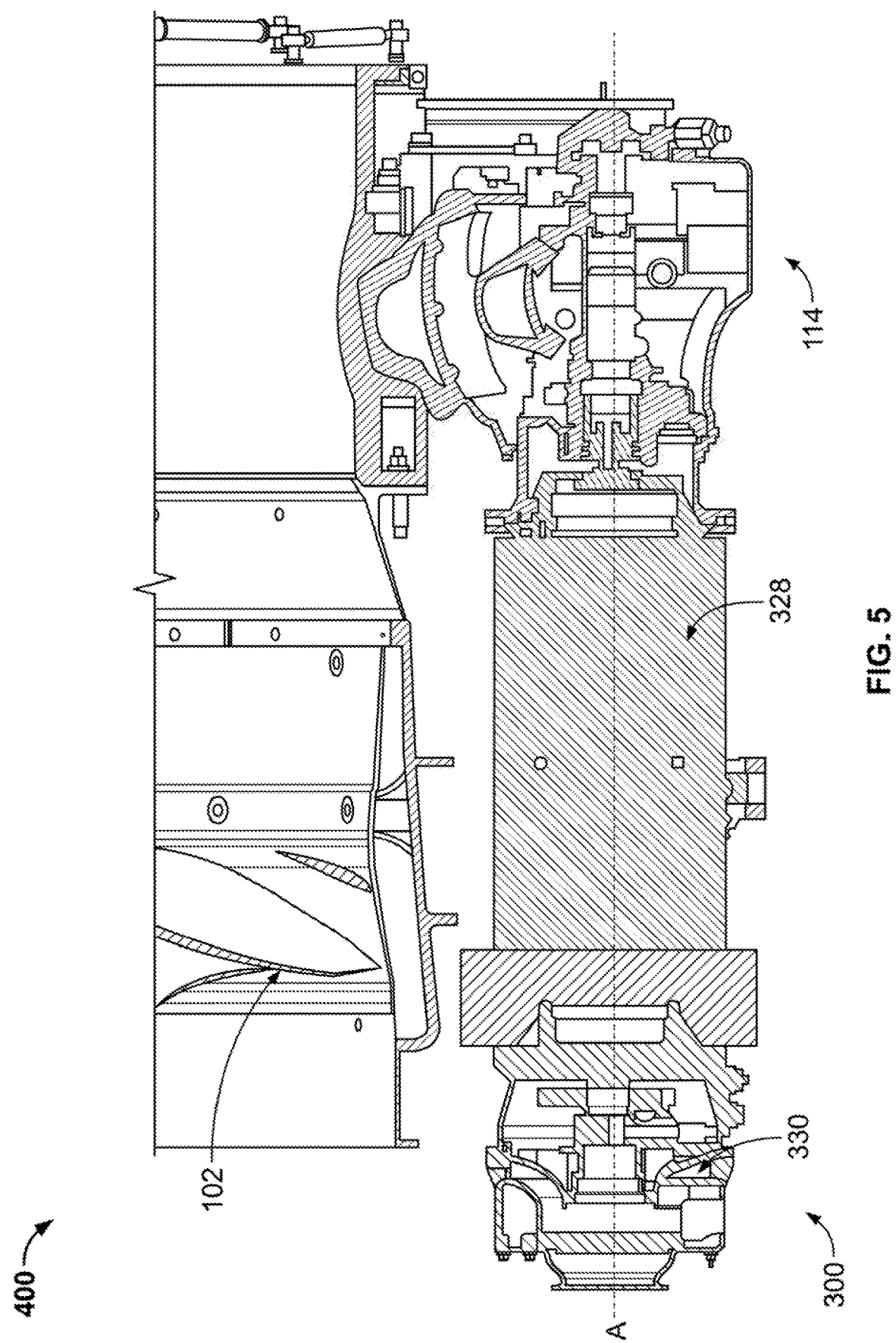
FIG. 5 is an axial profile view of the installed dual mode starter generator of FIG. 4.

The placement of DMSG 300 is further illustrated in FIGS. 4 and 5. FIG. 4 illustrates a perspective view of DMSG 300 mounted on auxiliary gearbox (AGB) 114 in relation to fan 102 of turbine 400. Further illustrated is pad 332 of AGB 114, to which a component may be coupled.

DMSG 300 may be mounted onto a pad, such the pad to which ATS 116 is coupled, that is capable of supporting the torque required to start turbine 400. By supplying the outputs of starters 328 and 330 to a single pad, two different modes of starting turbine 400, electric and pneumatic, may be achieved without redesigning or changing AGB 114. Additionally, the electric starter 328 may also function as a generator, thereby allowing for more electrical power generation without changing generator 118 or otherwise changing AGB 114 to support an additional generator.

FIG. 5 illustrates an axial cross section view of the turbine 400 of FIG. 4. As can be seen, DMSG 300 is mounted axially forward of AGB 114. ATS 330 may be located axially forward of and coupled to electric starter 328.

Figure 6A:
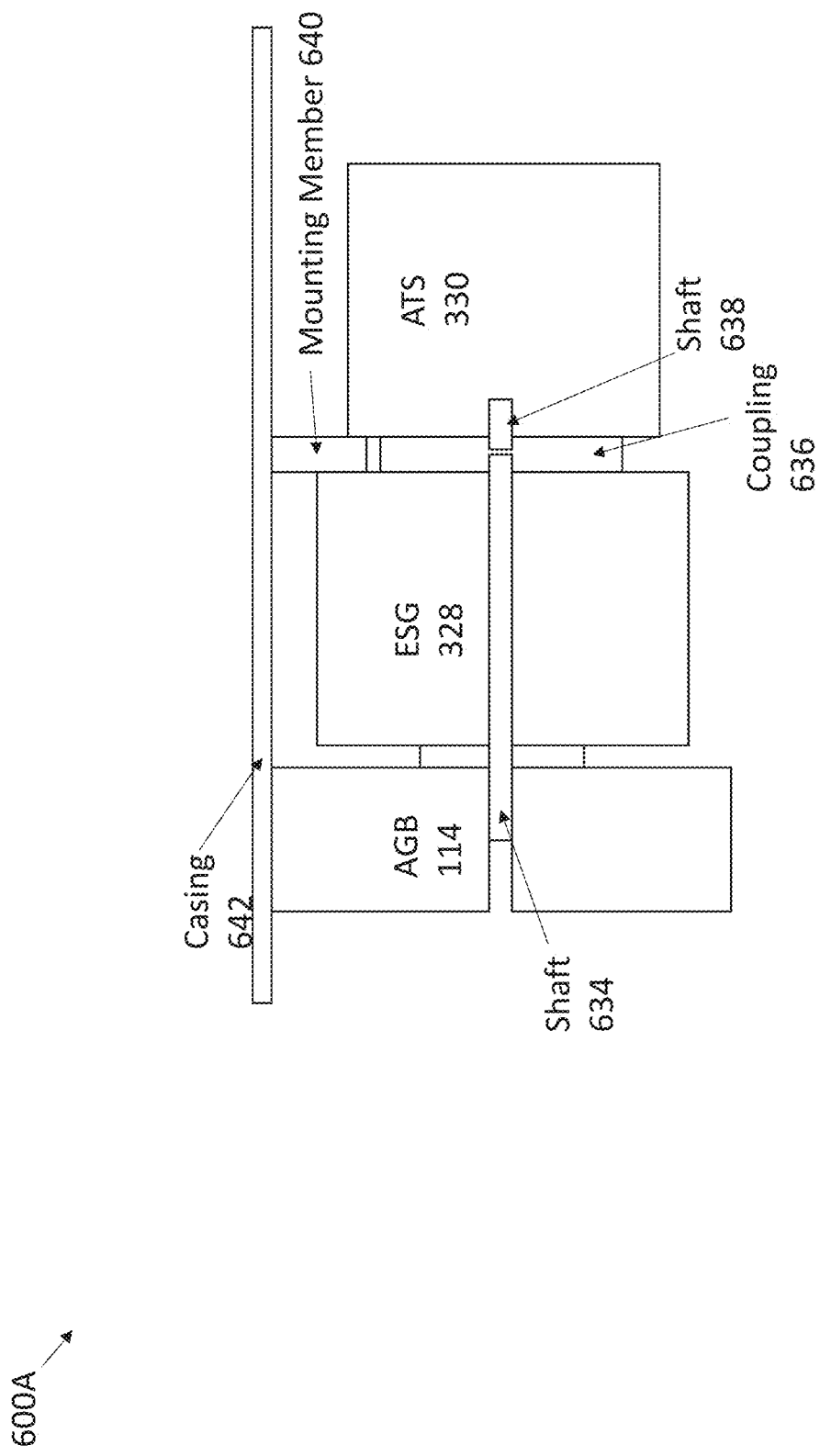

In accordance with some embodiments, block diagrams of dual mode starter generator systems 600A-E are illustrated in FIGS. 6A-6E. With reference to FIG. 6A, the system 600A may comprise an AGB 114, ESG 328 and ATS 330. AGB 114 may have an input shaft 634. ESG 328 may be permanently coupled to the input shaft 634. As used herein, "permanently coupled" is used to indicate a connection that is not provided for by a selectively coupling means, such as a clutch. In other words, each of the two components permanently coupled to one another will always rotate when one of those components is rotating.

ATS 330 may be selectively coupled to ESG 328 (and therefore input shaft 634) via a coupling 636. Coupling 636 may be, a clutch (e.g., an overrunning clutch, a hydraulic clutch or friction clutch, etc.). An overrunning clutch allows a starting torque to be transferred out of ATS 330, but prevents the ATS 330 from being driven through the coupling 636 by the turbine or ESG 328. Various types of overrunning clutches are known, e.g., sprang, roller ramp, wrap, and wedge style clutches. ATS 330 may having an output shaft 638 that is coupled to the coupling 636. Output shaft 638 may be coaxial with input shaft 634.

In accordance with some embodiments, ATS 330 may be mounted onto and supported by ESG 328. By mounting one of the starters (e.g., ATS 330) onto the other (e.g., ESG 328) the DMSG may be coupled to a single pad and input shaft 634 of AGB 114. However, this particular method of coupling the DMSG to AGB 114 may require reinforcement of AGB 114 or other components to support the additional weight of DMSG compared to a lone ATS or ESG. For example, DMSG system 600A may further comprise a mounting member 640 that is configured to support the weight of the DMSG of system 600A. In accordance with some embodiments, mounting member 640 may comprise an component configured to dampen the dynamic, moment load placed on the AGB during aircraft maneuvers. For example, mounting member 640 may comprise springs, shocks, or both. In accordance with some embodiments, the shocks may be an active damper that dynamically changes the damping rate of mounting member 640.

Mounting member 640 may couple the DMSG to a casing 642 or other structural element of the turbine engine. Mounting member 640 may be coupled to ESG 328, ATS 330, or both.

Figure 6B:
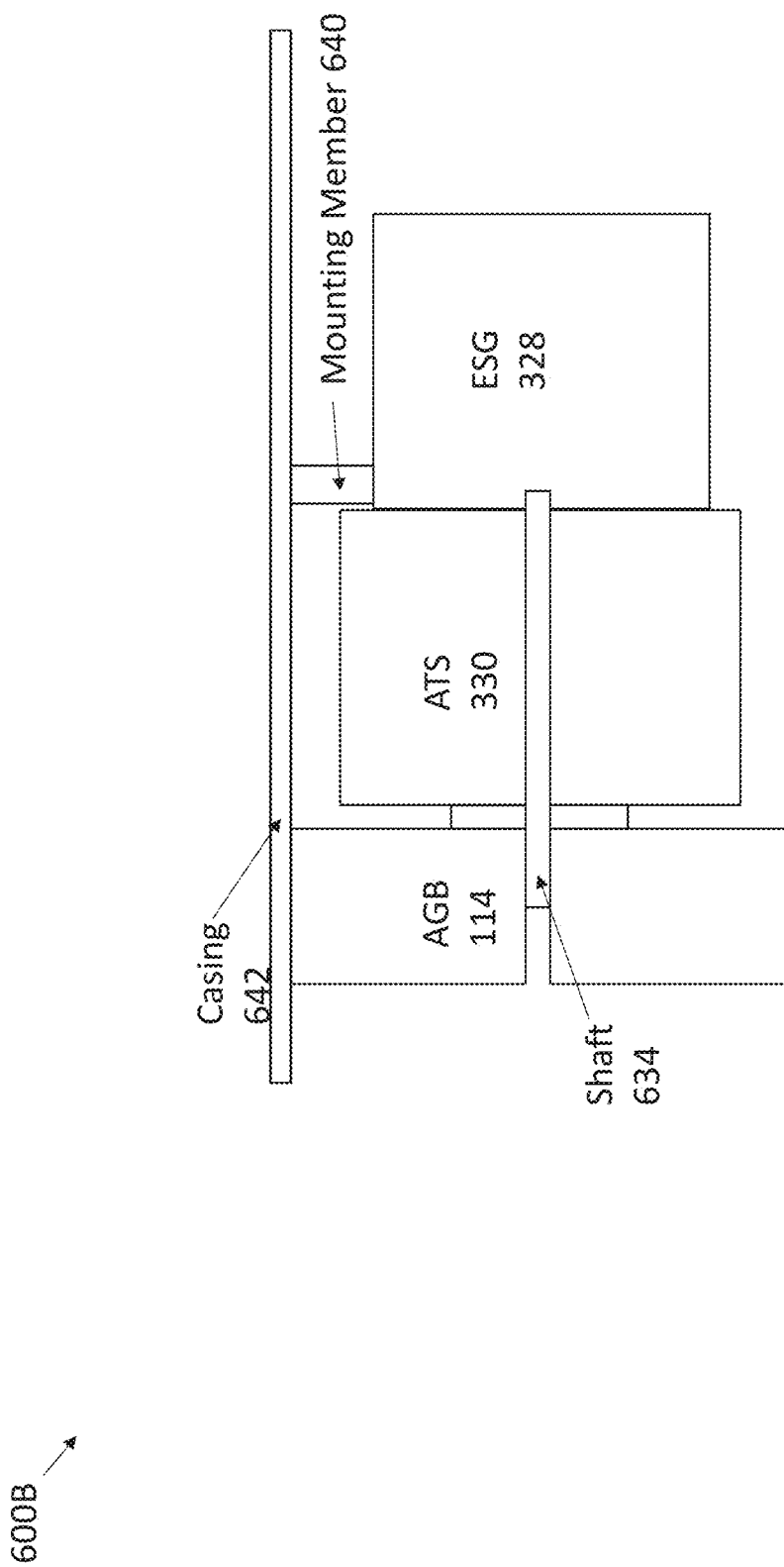

Turning to FIG. 6B, another DMSG system 600B is illustrated. The DMSG system 600B of FIG. 6B is similar to that shown in FIG. 6A with some differences. Here, ATS 330 is permanently coupled to or mounted on input shaft 634. Additionally, ATS 330 and ESG 328 have switched positions such that ESG 328 is now more distance from AGB 114 than is ATS 330.

In accordance with some embodiments, a DMSG system 600C is illustrated in FIG. 6C. System 600C is similar to system 600A with the addition of gearbox 646. Gearbox 646 may be coupled to input shaft 634 and output shaft 638 of ESG 328. Gearbox 646 may be necessary to increase or decrease the torque output from ESG 328, ATS 330, or both. As further shown below, additional gearboxes may be placed between the ESG 328 and ATS 330 to account for the different torque profiles and operating speeds between these two components.

In accordance with some embodiments, a DMSG system 600D is illustrated in FIG. 6D. System 600D is similar to system 600B with the addition of gearbox 646.

Figure 6E:
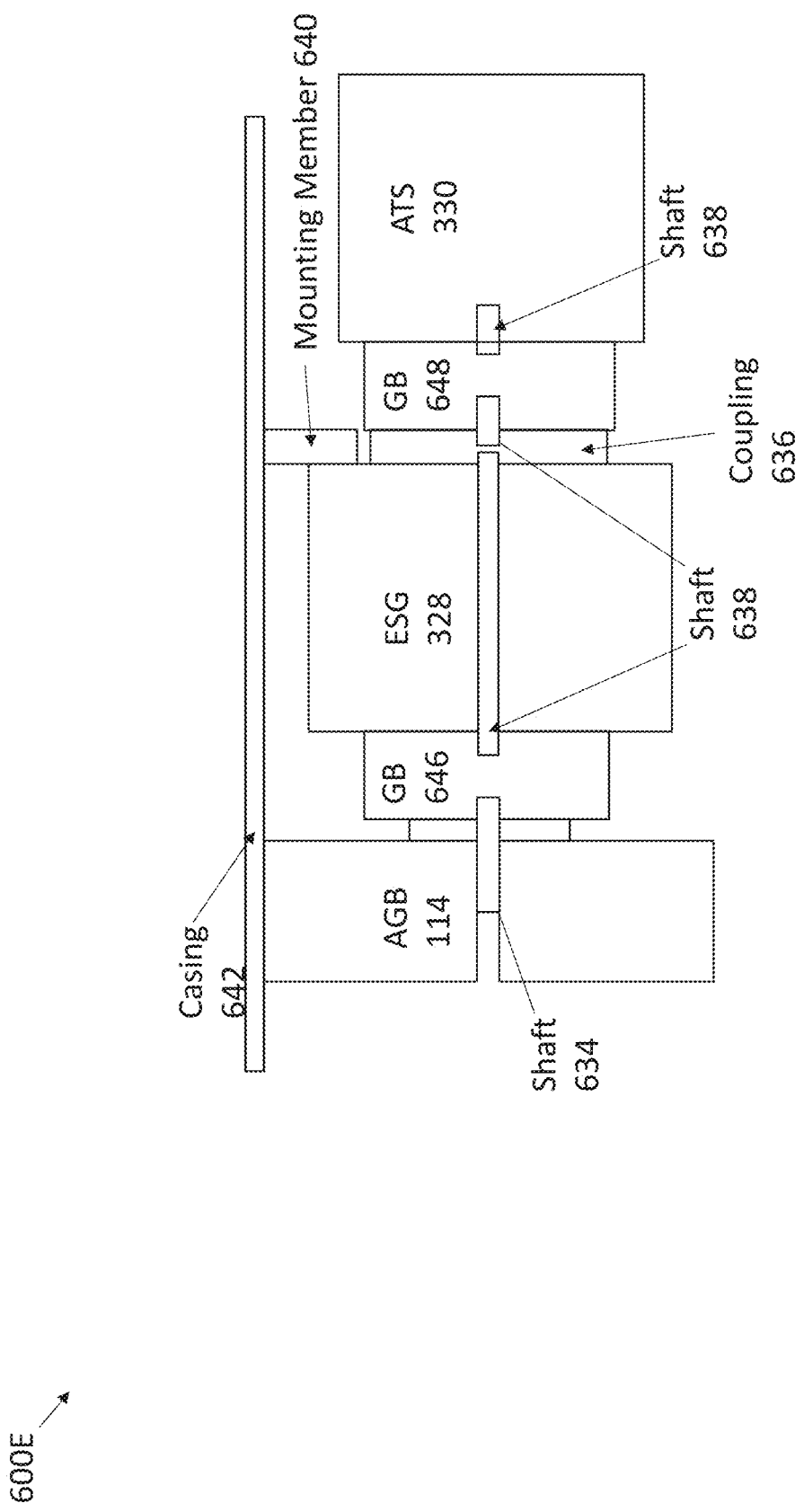

In accordance with some embodiments, a DMSG system 600E is illustrated in FIG. 6E. System 600E is similar to system 600C with the addition of another gearbox 648. In this embodiment, gearbox 646 is configured to multiply the torque outputted from ESG 328 and provide it to the AGB 114 via input shaft 634 at a design torque load. ATS 330 is configured to provide its starting torque at a different speed than ESG 328. As such, gearbox 648 is provided such that the output of ATS 330 is matched to the designed input of gearbox 646. ATS 330 may be selectively coupled to gearbox 648, or, as shown, gearbox 648 may be selectively coupleable to shaft 638 of ESG 328. In accordance with some embodiments, gearbox 648 has an input-to-output ratio of less than one.

In accordance with some embodiments, a DMSG system 700A is illustrated in FIG. 7A. System 700A may comprise the same components performing the same functions as described above with respect to system 600A. However, the ATS 330 of system 700A is mounted on a side of the AGB 114 opposite of the side to which ESG 328 is mounted such that the AGB 114 is located between the two. This embodiment may result a smaller axial extension of the DMSG away from AGB 114 when compared to the DMSGs illustrated in systems 600A-E. Additionally, the bending moment placed the AGB 114 may be reduced because the weight of the ESG 328 is, at least partially, countered by the weight of ATS 330.

In accordance with some embodiments, a DMSG system 700B is illustrated in FIG. 7B. System 700B may comprise the same components performing the same functions as described above with respect to system 700A, however, system 700B has an additional gearbox 646. Gearbox 646 may be coupled to input shaft 634 and the output shaft 638 of ESG 328. ESG 328 may be coupled to AGB 114 through gearbox 646. In accordance with some embodiments, gearbox 646 may have an input-to-output ratio of less than one.

In accordance with some embodiments, ATS 330 of system 700B may be coupled to AGB 114 through gearbox 646. For example, a lay shaft (not shown) may couple the ATS 330 and gearbox 646. The lay shaft may be located radially inward (toward casing 642) or outward (away from casing 642) of a portion of the AGB 114 such that it may extending axially between the ATS 330 and gearbox 646. In this embodiment, ATS 330 and ESG 328 may be connected to AGB 114 via the same pad on the same side of the AGB despite the AGB 114 separating the two starters. This embodiment may require additional support elements to support the ATS 330. These additional support elements may couple the ATS 330 and the casing 642, may couple the ATS 330 and ESG 328, or both.

In accordance with some embodiments, ESG 328 may be coupled to the input shaft 634 of AGB 114 via a lay shaft (not shown). In such an embodiment, ESG 328 may be located on a side of the AGB 114 that is opposite to the pad associate with the input shaft 634. Gearbox 646 may be located on either side of the AGB 114, such that the lay shaft (not shown) is coupled either between the gearbox 646 and input shaft 634 or between ESG 328 and gearbox 646. The lay shaft may be located radially inward (toward casing 642) or outward (away from casing 642) of a portion of the AGB 114 such that it may extend axially between the ESG 328 and/or gearbox 646 and the input shaft 634.

In accordance with some embodiments, a balancing member (not shown) may be added to ATS 330, ESG 328, or both. The balancing member functions primarily to add weight to one (or both) of the starters such that the bending moment of one of the starters is more closely countered by the bending moment caused by the combined weight of the other starter and the balancing member.

Figure 8A:
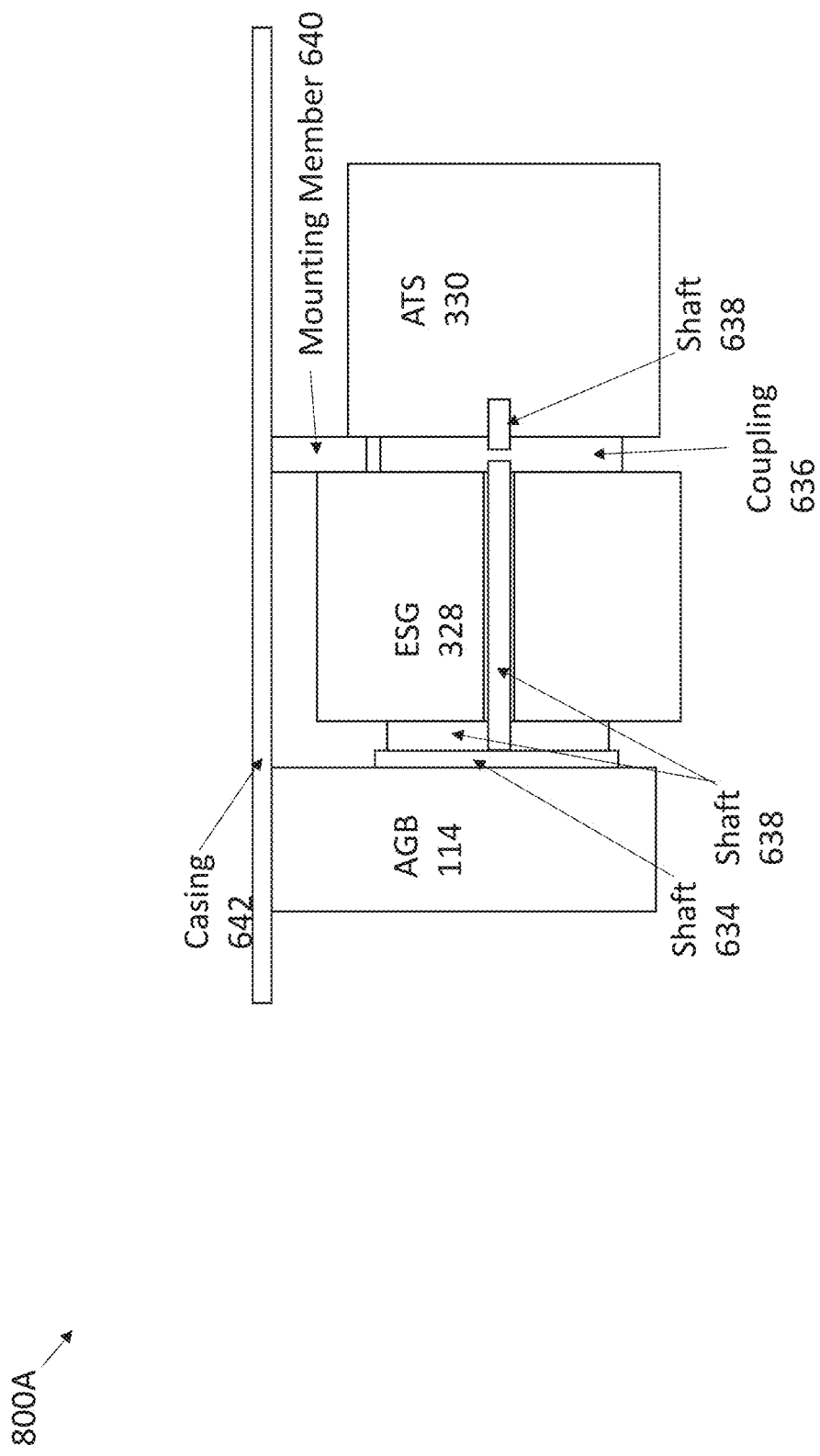

In accordance with some embodiments, a DMSG system 800A is illustrated in FIG. 8A. System 800A may comprise the same components performing the same functions as described above with respect to systems 600A-E and 700A-B, however, the ATS 330 and ESG 328 of system 800A are each connected to the input shaft 634 of AGB 114 separately from one another. Like systems 600A-E, ATS 330 and ESG 328 may be mounted on shafts that are coaxial with one another. Specifically, ATS 330 has an output shaft 638 coupling ATS 330 to coupling 636. Coupling 636 has an output shaft 638 coupling the coupling 636 to the input shaft 634. ESG 328 is located radially outward from and may surround the output shaft 638 of coupling 636. ESG 328 has its own output shaft 638 that also is located radially outward from and may surround the output shaft 638 of coupling 636.

ESG 328 output shaft is coupled to input shaft 634. In some embodiments, input shaft 634 may be replaced with a gear or other structure capable of receiving a rotational input from the output shafts 638.

In accordance with some embodiments, a DMSG system 800B is illustrated in FIG. 8B. System 800B may comprise the same components performing the same functions as described above with respect to system 800A, however, in this embodiment ESG 328 may be separated from the AGB 114 by ATS 330.

In accordance with some embodiments, a DMSG system 900A is illustrated in FIG. 9A. System 900A may comprise the same components performing the same functions as described above with respect to systems 600A-E, 700A-B, and 800A-B. However, ESG 328 and ATS 330 may be offset from one another such that neither is coaxial with the other. To accommodate this offset, a gearbox 944 may be coupled to the input shaft 634 of AGB 114 and to the respective output shafts 638 of ESG 328 and 638 of ATS 330. Gearbox 944 may contain various gears that couple the ESG 328 and ATS 330 to the gearbox 944. These gears may provide for different gear reduction ratios to account for the different operating speeds and torque output of ESG 328 and ATS 330.

In accordance with some embodiments, one of the ESG 328 or ATS 330 may be coaxial with input shaft 634. In some embodiments, one of the ATS 330 or ESG 328 may be located radially outward (i.e., with respect the turbine engine—here, away from casing 642) of the other. In some embodiments, ATS 330 may be located at a different circumferential position about the turbine engine than ESG 328.

Figure 9B:
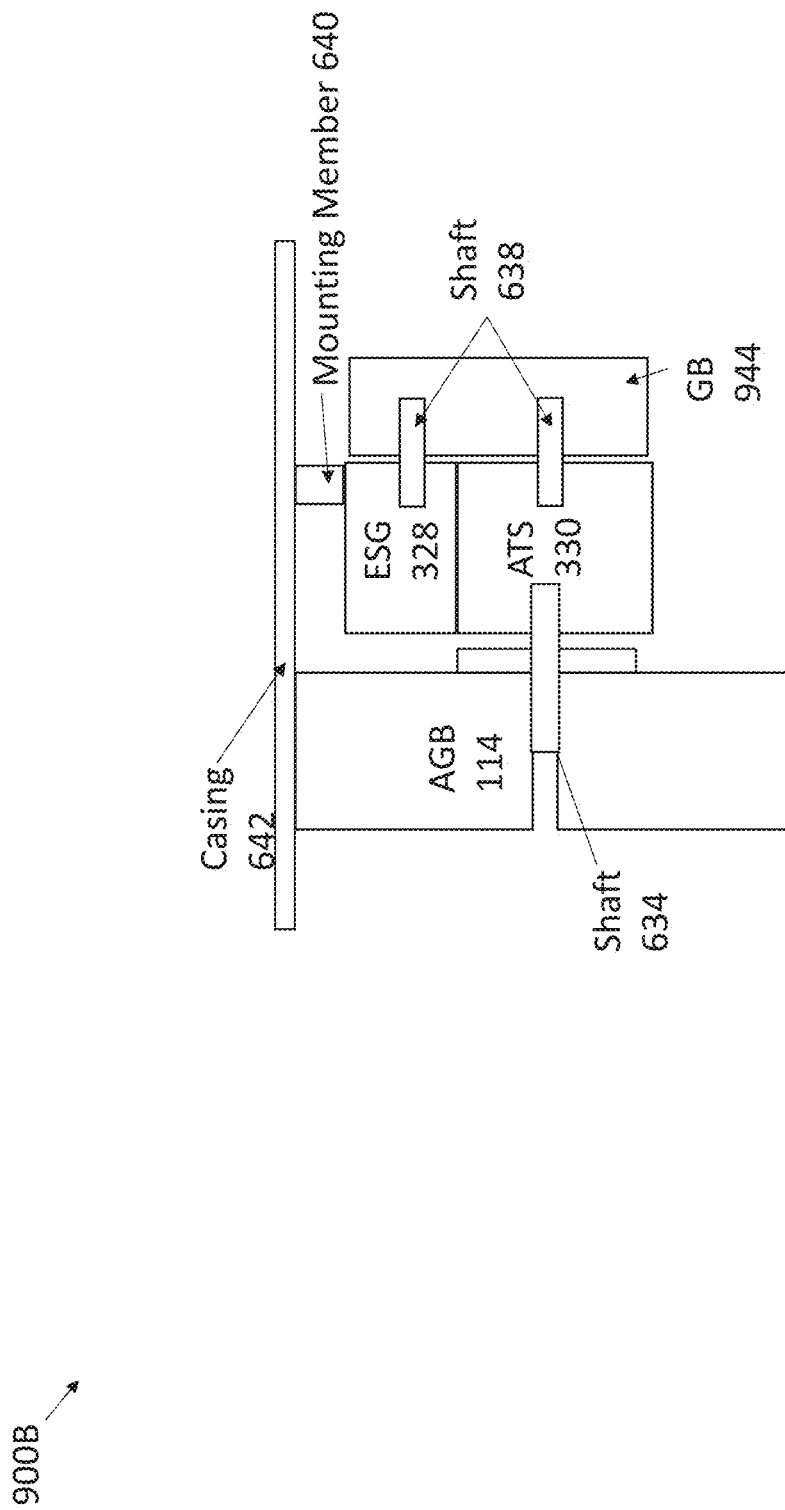

In accordance with some embodiments, a DMSG system 900B is illustrated in FIG. 9B. System 900B may comprise the same components performing the same functions as described above with respect to systems 900A. The primary difference between system 900A and 900B is that gearbox 944 is now separated from the AGB 114 by ESG 328 and ATS 330. ESG 328 outputs via shaft 638 to gearbox 944. Gearbox 944 outputs to ATS 330 via shaft 638. ATS 330 is coupled to the input shaft 634 of the AGB 114.

Figure 10A:
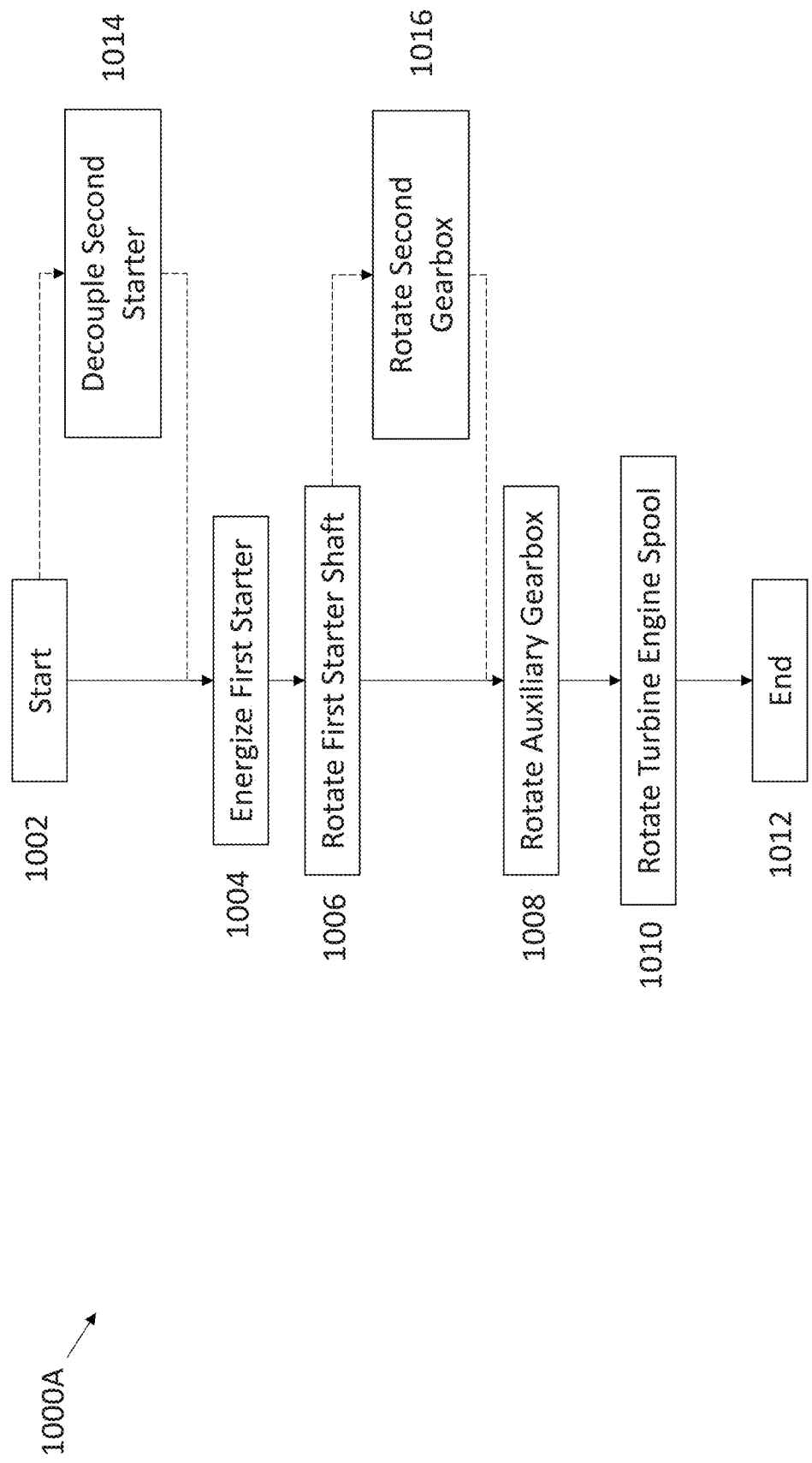
FIGS. 10A-10B are block diagrams of various methods of starting a turbine engine having a dual mode starter generator in accordance with some embodiments.

In accordance with some embodiments, a first mode 1000A of starting a turbine engine is provided for in FIG. 10A. The method may be applied to a turbine engine having a dual mode starter generator as described above in one or more of FIGS. 3 to 9B. The method may start at block 1002. At block 1004, a first starter may be energized. The first starter may be either an ESG or an ATS. Accordingly, "energized" should be understood to mean supplying the energy required to operate the starter—electricity for an electric starter and a fluid for an ATS. Energizing the first starter causes the shaft of the first starter to rotate at block 1006. Being coupled to the first starter shaft, the auxiliary gearbox will also rotate due to the rotation of the auxiliary gearbox input shaft at block 1008. The auxiliary gearbox is rotationally coupled to a spool of the turbine engine. Therefore, the turbine spool will begin to rotate at block 1010. The method may end at block 1012.

In accordance with some embodiments, the first mode 1000A may further comprise decoupling the second starter from the auxiliary gearbox at block 1014. This decoupling may occur prior to energizing the first starter. The second starter may be either the ATS or the ESG. The first mode 1000A may further comprise rotating a second gearbox at block 1016. The second gearbox may be coupled to both the first starter and the auxiliary gear box. In some embodiments, the second gearbox may be coupled to and in between the first and second starters.

Figure 10B:
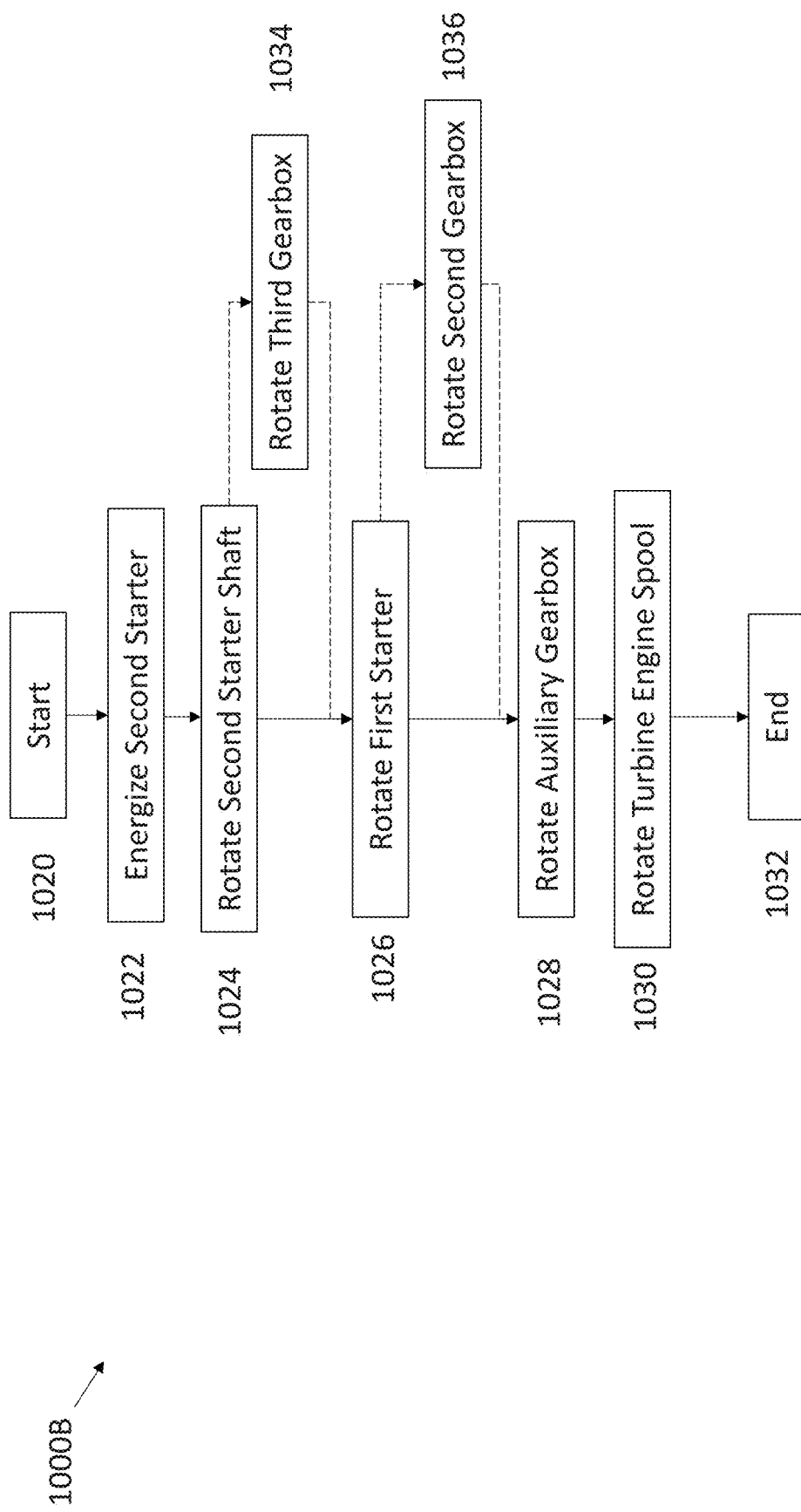

In accordance with some embodiments, a second mode 1000B of starting a turbine engine is illustrated in FIG. 10B. Like the first mode 1000A, the second mode may be applied to a turbine engine having a dual mode starter generator as described above in one or more of FIGS. 3 to 9B. The method may start at block 1020. At block 1022, the second starter may be energized. The second starter may be either an ESG or an ATS. Energizing the second starter cause the second starter shaft to rotate at block 1024. The first starter may be rotated at 1026 because the first starter and second starter may be coupled to one another via their respective shafts. In turn, the auxiliary gearbox is rotated (block 1028), as is a spool of the turbine engine (block 1032). The method may end at block 1032.

In accordance with some embodiments, a third gearbox may be rotated in block 1034. The third gearbox may be couple the second starter and the first starter. The third hear box may have an input-to-output ratio of less than one. In accordance with some embodiments, a second gearbox may be rotated in block 1036. The second gearbox may couple the first starter and the auxiliary gearbox. The second gearbox may have an input-to-output ratio of greater than one.

In accordance with some embodiments, the rotation of the second starter is independent of the rotation of the first starter shaft during the operation of the turbine. For example, the ATS may be configured to be decoupled from the auxiliary gearbox such that only the ESG is rotated while the turbine is operating.

In accordance with some embodiments, either the first mode 1000A or second mode 1000B may further comprise disconnecting an electric starter from an auxiliary power source and connecting the electric starter to an auxiliary load after the turbine engine has been started.

Although examples are illustrated and described herein, embodiments are nevertheless not limited to the details shown, since various modifications and structural changes may be made therein by those of ordinary skill within the scope and range of equivalents of the claims. For example, while various gearboxes and coupling members have been described herein, one of ordinary skill will understand that these components may be modified, moved, or deleted to achieve a particular purpose.

What is claimed is:

1. A gas turbine starting system comprising:
    a first gearbox having a gearbox input shaft, the gearbox input shaft rotationally coupled to a spool of a gas turbine;
    a second gearbox coupled to the gearbox input shaft;
    an air turbine starter mounted on a first-starter shaft, the air turbine starter coupled to the first gearbox via the second gearbox; and
    an electric starter-generator mounted on a second-starter shaft, the electric starter-generator coupled to the first gearbox via the air turbine starter and the second gearbox,
    wherein the air turbine starter and the electric starter-generator are located on a same side of the first gearbox, and wherein the electric starter-generator is coupled to the second gearbox through the air turbine starter.

2. The system of claim 1, wherein the electric starter-generator is selectively coupleable to the air turbine starter.

3. The system of claim 1, further comprising a third gearbox, the third gearbox coupling the air turbine starter and the electric starter-generator.

4. The system of claim 3, wherein the air turbine starter is selectively coupleable to the third gearbox.

5. A method of starting a turbine engine system having a first gearbox having a gearbox input shaft, the gearbox input shaft rotationally coupled to a spool of a gas turbine, a second gearbox coupled to the gearbox input shaft, an air turbine starter mounted on a first-starter shaft, the air turbine starter coupled to the first gearbox via the second gearbox, and an electric starter-generator mounted on a second-starter shaft, the electric starter-generator coupled to the first gearbox via the air turbine starter and the second gearbox, wherein the air turbine starter and the electric starter-generator are located on a same side of the first gearbox, and wherein the electric starter-generator is coupled to the second gearbox through the air turbine starter, the method comprising:
in a first mode:
energizing the air turbine starter; and
rotating the gearbox input shaft via the air turbine starter, wherein the rotation of the gearbox input shaft rotates the spool of the gas turbine.

6. The method of claim 5, further comprising:
decoupling the electric starter-generator from the first gearbox.

7. The method of claim 5, wherein rotating the gearbox input shaft further comprises rotating a gear of the second gearbox.

8. The method of claim 5, further comprising:
in a second mode:
energizing the electric starter-generator and rotating the second-starter shaft; and
rotating the gearbox input shaft via the second-starter shaft, wherein the rotation of the gearbox input shaft rotates the spool of the gas turbine.

9. The method of claim 8, further comprising:
wherein rotating the gearbox input shaft via the second starter shaft further comprises rotating a gear of a third gearbox, wherein the third gearbox is coupled to both the air turbine starter and the electric starter generator and the third gear box has an input to output ratio less than one.

10. The method of claim 8, wherein rotating the gearbox input shaft via the second starter shaft further comprises:
rotating a gear of the second gearbox; and
rotating a gear of a third gearbox, wherein the third gearbox is coupled between the air turbine starter and the electric starter generator,
wherein the second gear box has an input to output ratio less than one and the third gear box has an input to output ratio greater than one.

* * * * *